United States Patent

Zahn

[19]

[11] Patent Number: 5,520,504
[45] Date of Patent: May 28, 1996

[54] ASSEMBLY OF A SHEET-PROCESSING MACHINE AND A SHEET-PILE TRANSPORT SYSTEM

[75] Inventor: Erich Zahn, Egelsbach, Germany

[73] Assignee: Heidelberger Druckmaschinen AG, Heidelberg, Germany

[21] Appl. No.: 396,878

[22] Filed: Mar. 1, 1995

Related U.S. Application Data

[63] Continuation of Ser. No. 183,565, Jan. 19, 1994, abandoned, which is a continuation of Ser. No. 736,464, Jul. 26, 1991, abandoned.

[30] Foreign Application Priority Data

Jul. 27, 1990 [DE] Germany ............... 40 23 877.6

[51] Int. Cl.⁶ ................................................ B65H 31/30
[52] U.S. Cl. ........................... 414/790.7; 414/795.8; 414/926
[58] Field of Search ............................ 198/782, 785; 414/788.7, 795.8, 927, 924, 926, 790.7

[56] References Cited

U.S. PATENT DOCUMENTS

| | | | |
|---|---|---|---|
| 2,671,988 | 3/1954 | Walters | 198/785 X |
| 2,946,465 | 7/1960 | Raynor | 414/927 X |
| 3,104,100 | 9/1963 | Watts et al. | |
| 4,222,697 | 9/1980 | Vits . | |
| 4,635,924 | 1/1987 | Pollich | 271/227 |
| 4,703,924 | 11/1987 | Marass | 271/9 |
| 4,988,263 | 1/1991 | Odenthal | 414/795.8 |
| 5,011,126 | 4/1991 | Suzuki et al. | 414/795.8 X |

FOREIGN PATENT DOCUMENTS

| | | |
|---|---|---|
| 1099556 | 8/1961 | Germany . |
| 1144742 | 9/1963 | Germany . |
| 2751489 | 2/1979 | Germany . |
| 2736832 | 3/1979 | Germany . |
| 3433994 | 3/1986 | Germany . |
| 3504491 | 1/1989 | Germany . |
| 3835268 | 4/1990 | Germany . |
| 1446057 | 12/1988 | U.S.S.R. ......................... 198/782 |
| 2207907 | 2/1989 | United Kingdom . |

OTHER PUBLICATIONS

"Drupa 90 HN 1/48" Heidelberger Druckmaschinen AG.
German Industrial Standard (DIN) 15 141, Part 1, Aug. 1977.

*Primary Examiner*—William E. Terrell
*Assistant Examiner*—Janice L. Krizek
*Attorney, Agent, or Firm*—Herbert L. Lerner; Laurence A. Greenberg

[57] ABSTRACT

The combination of a sheet-processing machine and a transport system for sheet piles includes a device for passing sheets through the sheet-processing machine in a given direction of travel; a pile support assigned to the machine; a device for carrying the pile support; and a device for raising and lowering the carrying device together with the pile support to upper and lower levels, respectively; the carrying device including a first transport device for moving the pile support horizontally with respect to the carrying device; second transport device disposed on both sides of the sheet processing machine and assigned to the first transport device for moving the pile support horizontally; the first transport device of the carrying device in the lower-level position of the carrying device and the second transport device assigned to the first transport device forming a conveyor section composed of aligned conveyor section parts for transporting a pile support in a transport direction transverse to the given direction of travel; the pile support being formed as a flat pallet; and the conveyor section having guidance device comprising first and second guide elements in cooperative engagement directly with the flat pallet for rectilinearly guiding the flat pallet along the conveyor section.

10 Claims, 9 Drawing Sheets

1

ASSEMBLY OF A SHEET-PROCESSING MACHINE AND A SHEET-PILE TRANSPORT SYSTEM

This application is a continuation of application Ser. No. 08/183,565, filed Jan. 19, 1994, now abandoned, which is a continuation of application Ser. No. 07/736,464, filed Jul. 26, 1991, now abandoned.

SPECIFICATION

The invention relates to an assembly or combination of a sheet-processing machine and a sheet pile transport system.

In general practice, the supplying of sheet piles to a sheet-processing machine and the removal of sheet piles from the machine remain predominantly involved with operations which, in the case of a sheet-fed printing machine, for example, must be performed in the very position in which a press operator should, in fact, have unobstructed access to the machine, i.e., in front of a feeder and behind a delivery, as viewed in the direction in which the sheets pass through the machine, i.e., their direction of travel. On the other hand, it has become known from printed publications to provide an arrangement in which a sheet pile is supplied to a feeder from a position at a side of the feeder. An arrangement suitable for this purpose is described, for example, in German Published Prosecuted Application (DE-C2) 35 04 491. In this regard, a pair of rails are provided on both sides of the feeder and extend transversely to the direction in which the sheets pass through an accompanying printing unit of a sheet-feed printing machine. The feeder includes a carrying device, which can be raised to an upper level and lowered down to a lower level, and which is in the form of a lifting plate horizontally suspended on hoisting or lifting chains. In a lower-level position of the lifting plate, the aforementioned pairs of rails align or become flush with a pair of rails provided on the lifting plate. A type of platform truck is provided as a pile support and is drivable on a track formed by the pairs of rails by means of a coupled chain drive and a drive motor operating the chain drive. Although guide means are thus provided in the form of the aforementioned track, loading of the feeder with a sheet pile which is correctly oriented with respect to the machine nevertheless requires, at least, a suitable orientation of the sheet pile with respect to the platform truck. In this regard, the heretofore known arrangement includes a prestacker assigned to at least one of the pairs of rails installed at the side of the feeder. The prestacker permits a sheet pile having a correct orientation with respect to the machine to be built up on a platform truck which has been moved into the vicinity of the prestackers. Prestacking of this type is performed manually and therefore involves quite considerable costs for wages. The scale of these costs increases in proportion to the sheet-throughput of the printing machine and the accompanying demand for prestacked sheet piles by a corresponding feeder. From a purely technical point of view, it is true that a sheet-throughput up to a certain limit can be satisfied by prestackers arranged at both sides of the feeder, as proposed in the heretofore known arrangement, however, the advantage achieved thereby through automatic loading of the feeder with sheet piles correctly oriented with respect to the machine must be paid for by considerable physical effort on the part of an operator and by high wage costs in the case of modern sheet-fed printing machines which normally operate with a high sheet-throughput.

To preserve the leading edges of sheets stacked to form a pile and facing a printing unit attached to the feeder, front stops for the leading sheet edges are arranged in the prestacker in an offset position with respect to the corresponding front stops of the feeder. It is true that a sheet-pile, which is prestacked on a platform truck in the vicinity of the prestacker and which has been transported by transportation means in the form of the platform truck, a truck-guiding track and a truck-displacing chain drive, is thus correctly oriented with respect to the machine; however, it is not yet correctly positioned relative to the machine. For a correct position of the sheet pile with respect to the machine, the aforementioned leading edges of the sheets would also have to lie against or abut the front stops provided on the feeder. In the heretofore known arrangement, however, this condition is not reached because of the aforementioned offset of the front stops.

In another heretofore known arrangement (German Patent 11 44 742), after a sheet pile on a carrying device has been correctly oriented initially relative to the machine, the sheet loading edges are automatically brought into engagement with corresponding front stops of the feeder while the carrying device is being lifted. A displacement of the sheet pile in a direction towards the front stops of the feeder is achieved by an arrangement in which the carrying device is suspended by cables which, in a lower-level position wherein the carrying device rests on a machine foundation, are inclined with respect to the carrying device in a direction towards the front stops, so that when the carrying device is raised, a component of gravitational force directed towards the front stops presses the leading edges against these front stops.

In this heretofore known arrangement, however, the aforementioned initial or preliminary correct orientation of the sheet pile with respect to the machine must be viewed as problematical inasmuch as this arrangement includes no devices by means of which the leading edges of the sheets forming the pile could be oriented with respect to the front stops of the feeder. Instead, the sheet pile must be brought into its position on the carrying device by means of a manual stacker or a fork stacker.

Lateral removal of a sheet pile from the delivery of a sheet-fed printing machine and lateral loading of the delivery with a pile support has become known from, among other publications, the special publication "Drupa 90 HN 1/48" of Heidelberger Druckmaschinen AG. In this regard, a conveyor arrangement running transversely through the delivery is provided for supplying the delivery with pile supports and for removing sheet piles which have been stacked on these pile supports. Supplying the associated feeder with sheet piles and removing used pile supports from the feeder are thus effected by means of transportation devices which include a conveyor section arranged in front of the feeder, as viewed in a direction in which the sheets pass or travel through the printing units associated therewith, and oriented transversely, such as, at right angles, to the direction of travel, the conveyor section cooperating with transportation means which are arranged within the feeder as well as in a transfer station and which are constructed for conveying in the direction of travel. The flat pallets, on which the sheet piles are stacked in the delivery condition, are thus used as pile supports. The conveyor section has a truck which can be driven on rails. The transportation means of the transfer station transfer to the truck a sheet pile-supporting pallet which is simultaneously oriented and placed on this transfer station. Orientation in the transfer station is performed by means of stops lying opposite one another and cooperating with opposite faces of a respective pallet. In addition, the arrangement includes a driverless conveyor system which forms a link between the feeder and the delivery for supplying to the delivery empty pallets accumulating at the feeder, and which also forms a link from the printing machine as a whole to suitable temporary storage positions for piles of, respectively, unprinted and printed sheets stacked on pallets.

It is accordingly an object of the invention to provide, in combination, a sheet-processing machine and a sheet pile transport system which permit an operator to work without hindrance and to dispense with the previously described state-of-the-art arrangements for orientation or registration of the sheet piles, such as prestackers or transfer stations with orientation or alignment devices, while simultaneously retaining the possibility of correct orientation or registration and positioning of the sheet piles with respect to the machine.

With the foregoing and other objects in view, there is provided, in accordance with the invention, the combination of a sheet-processing machine and a transport system for sheet piles, comprising means for passing sheets through the sheet-processing machine in a given direction of travel; a pile support assigned to the machine; means for carrying the pile support; and means for raising and lowering the carrying means together with the pile support to upper and lower levels, respectively; the carrying means comprising first transport means for moving the pile support horizontally with respect to the carrying means; second transport means disposed on both sides of the sheet processing machine and assigned to the first transport means for moving the pile support horizontally; the first transport means of the carrying means, in the lower-level position of the carrying means, and the second transport means assigned to the first transport means forming a conveyor section composed of aligned conveyor section parts for transporting a pile support in a transport direction transverse to the given direction of travel; the pile support being formed as a flat pallet; and the conveyor section having guidance means comprising first and second guide elements in cooperative engagement directly with the flat pallet for rectilinearly guiding the flat pallet along the conveyor section.

In accordance with the invention, an area directly in front of the feeder and/or behind the delivery is freely accessible, in an advantageous manner, at any time for an operator attending a sheet-fed printing machine, so that he or she is able, for example, to perform adjustment work on a sheet separating device of the feeder or to remove a specimen sheet at the delivery. In addition, sheet piles in the delivery condition thereof, i.e. in particular, sheet piles for which manually performed correct machine-related prestacking is not required, can be used for loading the feeder. In the delivered condition, sheet piles are usually stacked on flat pallets in such a way that a longitudinal edge of a flat pallet is flush or aligned with a longitudinal lateral surface of a sheet pile.

A further advantage resides in the fact that flat pallets provided for loading, with sheet piles stacked thereon, if necessary or desirable, and flat pallets intended for removal upon which sheet piles can also be stacked, do not obstruct one another either during loading or during removal, as is the case with conventional transport arrangements which are in combination with a sheet-fed printing machine, wherein suitable conveyor sections are provided for transportation in a first direction as well as in a second direction opposite to the first direction.

In accordance with another feature of the invention, the combination includes means for shifting with respect to the carrying means the flat pallet carried by the carrying means and oriented by the guidance means in a direction transverse to the direction of transport while retaining orientation of the flat pallet. This, furthermore, also permits gentle treatment of the aforementioned leading edges of the sheets, because a respective sheet pile can thereby be loaded into the feeder so that it does not come into contact with possible obstructions, e.g. the aforementioned front stops, and can be brought into engagement with these front stops by the shifting means only when a position which is correct with respect to a side register has been attained. To remove from the feeder a used pallet initially brought into engagement with the front stops, the pallet can be moved by the shifting means so far away from the front stops that it can be transferred without hindrance from the first transporting means located on the carrying means to second transport means arranged outside the feeder.

When a sheet pile stacked on a flat pallet in the above-mentioned delivery condition is placed on a partial conveyor section formed by the second transport means assigned to the feeder, in order to achieve correct positioning with respect to the machine, care must be taken only that the longitudinal lateral surface of a sheet pile which is flush or aligned with a longitudinal edge of the flat pallet faces towards a printing unit located downstream from the feeder after the sheet pile has been transported into the feeder, and that the flat pallet supporting the sheet pile is introduced into the partial conveyor section in such a way that its guidance means are in contact with the flat pallet. A sheet pile can be introduced into the second transport means in this way with the aid of the usual auxiliary devices, e.g. a stacker truck or a driverless conveyor system.

In accordance with a further feature of the invention, the conveyor section has parallel guideways oriented in the direction of transport, and the flat pallet has opposite surfaces oriented in the direction of transport for guiding the flat pallet on the guideways.

An important advantage of this further development resides in that, to construct a conveyor section, it is only necessary to combine conventional transport means, e.g. rollers, balls or chains, with appropriate carrying and bearing structures and also with the guidance means in the form of respective pairs of rails or roller trains, so that existing conveyor arrangements can be retrofitted if necessary to implement the invention.

In accordance with an added feature of the invention, the first and second transport means have cylindrical rotation members formed with guide flanges, and the flat pallet has opposite edges oriented in the direction of transport and cooperatively engageable with the guide flanges.

In this regard, it is possible, especially, to use rollers with respective constant cross sections onto which guide flanges are slid and fixed so as to form a combination with the guidance means.

Irrespective of the format of the sheet to be processed, care is always taken that, in the feeder, a lateral surface of a sheet pile, facing in the direction of travel and correctly positioned with respect to the machine, lies against the aforementioned front stops.

This circumstance is taken into account in accordance with an additional feature of the invention, wherein the flat pallet has a side thereof in contact with the first guide elements, and has a lateral surface substantially flush with a lateral surface of a sheet pile stacked on the flat pallet, the lateral surface of the sheet pile extending in the direction of travel, the first guide elements being in a position independent of a format of sheets in the sheet pile.

A result of this arrangement is that the sheet pile which is moved in the feeder, by the coordination of the first and second transport means, along the conveyor section into a correct position with respect to a side register, has a lateral surface facing in the direction of travel which is located at a predetermined spaced distance from the front stops, that distance being independent of the format of the sheets to be printed, and the sheet pile can then be moved over that distance in the direction towards the front stops by the shifting means until contact is made with the front stops.

Different formats of the sheets to be printed and, accordingly, different formats of flat pallets can thus be taken into consideration in different ways with the foregoing construction of the invention.

In accordance with yet another feature of the invention, a plurality of the second guide elements are located at spaced distances from each of the first guide elements, the spaced distances being dependent upon the format of sheets to be processed.

In accordance with an alternate feature of the invention, a respective single one of the second guide elements is located at a spaced distance from each of the first guide elements and is adjustable to the format of sheets to be processed.

In accordance with yet a further feature of the invention, the flat pallet is formed with elongated span members for supporting the flat pallet on the conveyor section, and the first and the second guide elements are in contact with the flat pallet at a respective longitudinal side of the elongated span members.

The last-mentioned feature of the invention, in particular, proves to be especially advantageous when flat pallets constructed in accordance with the German Industrial Standard (DIN) 15 141, Part 1 with longitudinally arranged bottom supports are used.

The correct orientation or registration and positioning, with respect to the machine, of a sheet pile in the feeder, which are achieved, in particular, with the guidance means and the shifting means, can be optimized with respect to a position which is correct in relation to a side register, in accordance with yet an additional feature of the invention, wherein the first transport means is assigned to a sheet feeder of the sheet-processing machine, and which includes a drive system for the first transport means, and sensor means for locating an edge of a sheet to be processed which is oriented in the direction of travel, the flat pallet with a sheet pile stacked thereon being supported by the carrying means and being adjustable correctly in side register by the first transport means, the drive system therefor and the sensor means.

In this manner, already existing transport means can be advantageously used for moving a sheet pile which is located in the feeder and is in a position correct with respect to a side register.

In accordance with a concomitant feature of the invention, the flat pallet is disposed on the first transport means and rectilinearly guided by the guidance means, the flat pallet having one end facing in the direction of travel and projecting in the direction of travel beyond the guidance means and the first transport means.

Such a feature provides the advantage that the lateral surface of a sheet pile placed in the feeder and facing in the direction of travel can be brought into contact with the aforementioned stops without requiring any further special constructional arrangements, because no attention has to be given to any possible collisions occurring between the front stops, on the one hand, and the transport means, as well as the guidance means, on the other hand.

Other features which are considered as characteristic for the invention are set forth in the appended claims.

Although the invention is illustrated and described herein as embodied in an assembly of a sheet-processing machine and a sheet-pile transport system, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings, in which.

Figure 1A:
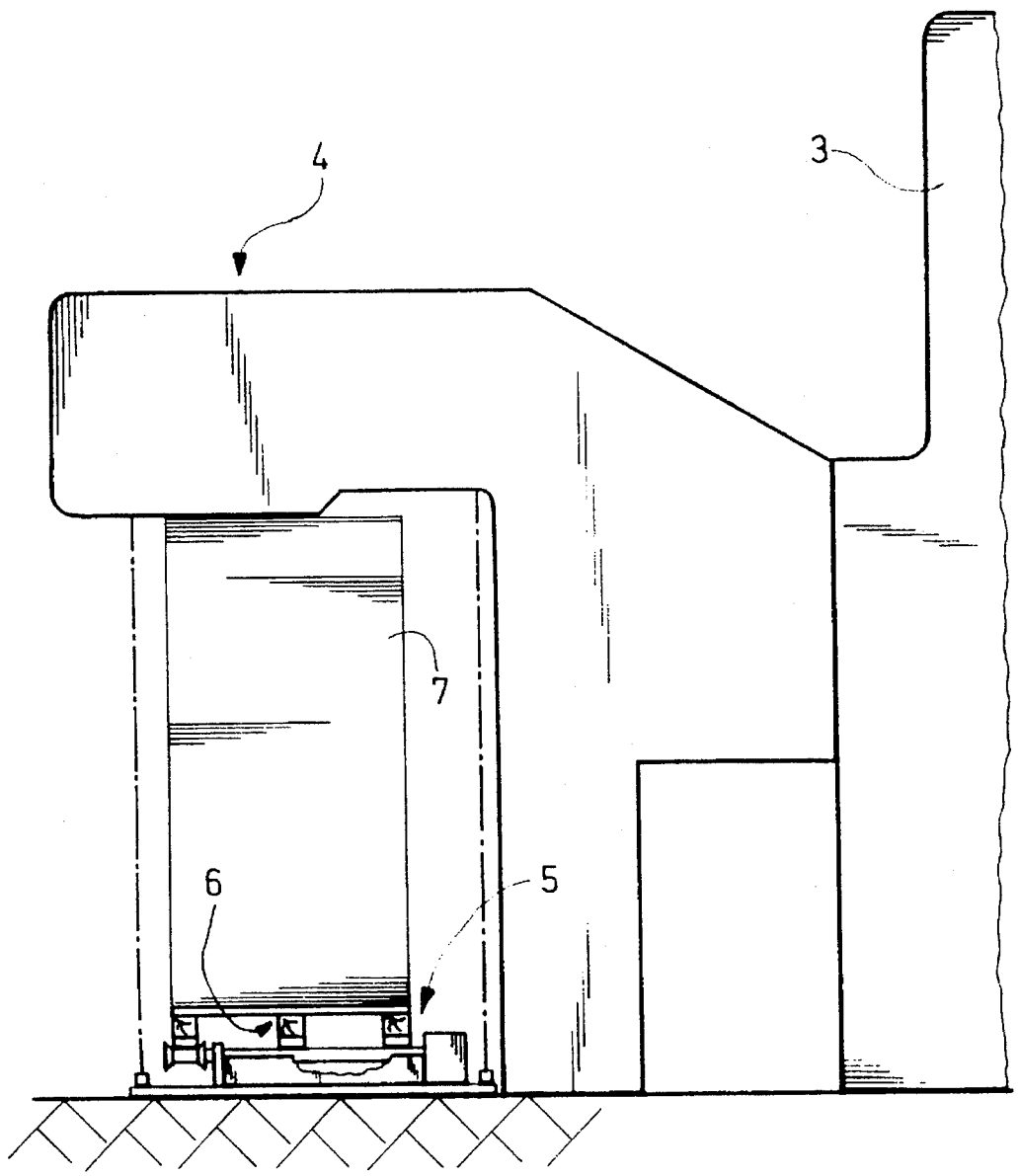
FIGS. 1a and 1b are respective left-hand and right-hand portions of a simplified side elevational view of a sheet-processing machine with a feeder and a delivery constructed in accordance with the invention.
Figure 1B:
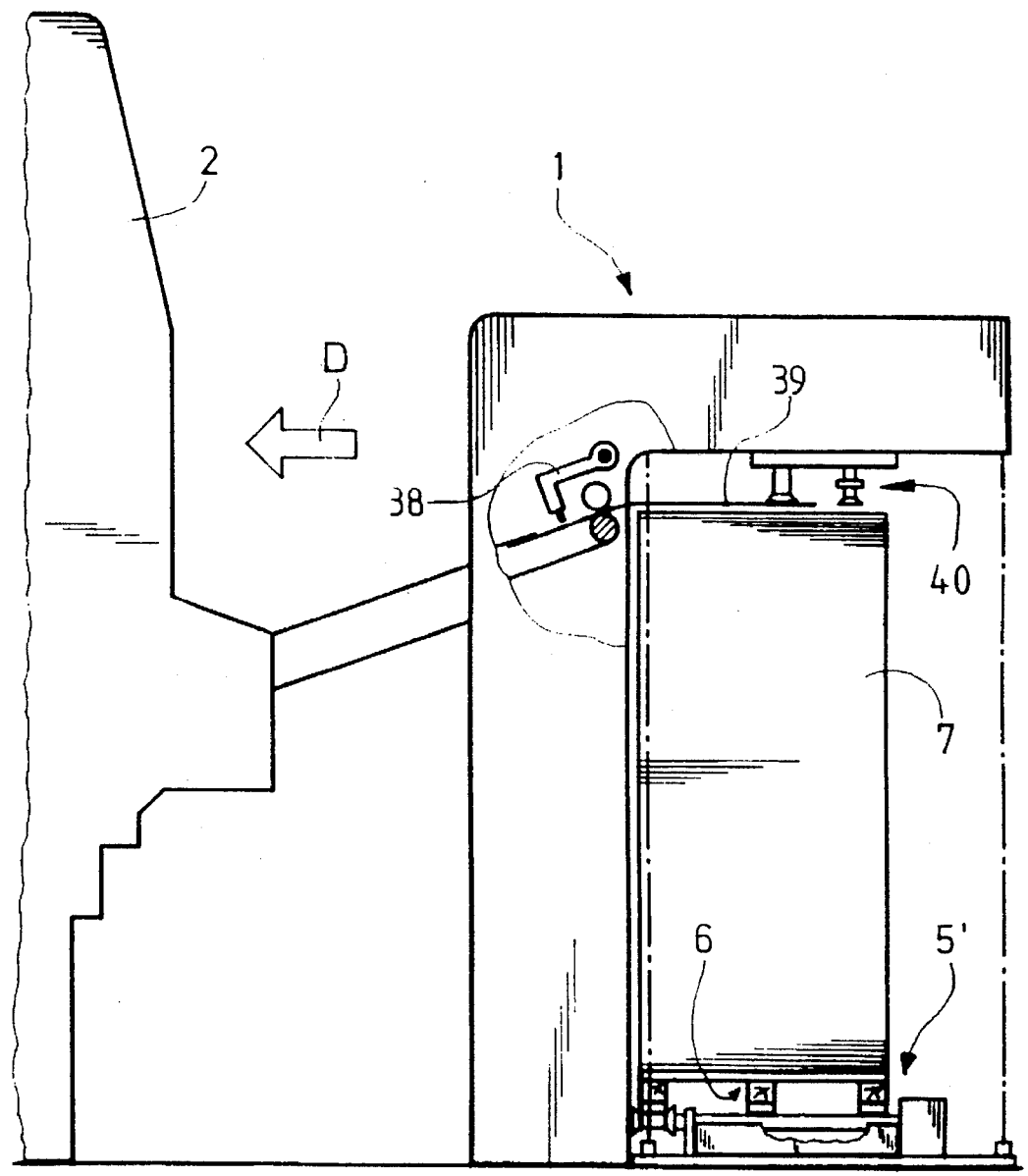

Referring now to the drawings and, first, particularly to FIGS. 1a and 1b thereof, there is shown therein diagrammatically a sheet-processing machine in the form of a sheet-fed printing machine with a feeder 1, a first printing unit 2, a final printing unit 3 and a delivery 4. Sheets pass from the feeder 1 to the delivery 4 through the sheet-fed printing machine in a direction of travel represented by the arrow D. A carrying device 5, 5' for a sheet pile 7 stacked on a pile support constructed as a flat pallet 6 is provided in the feeder 1 and the delivery 4, respectively. The carrying device 5, 5' of the feeder, and the delivery 4, respectively, is suspended on lifting elements in the form of cables or chains represented in phantom in FIG. 1. By means of these lifting elements, the carrying device 5, 5' may be raised to an upper level and may be lowered down to a lower level. FIGS. 1a and 1b illustrate an operating condition in which both carrying devices 5 and 5' have been lowered down to a lower level. As is evident from the aforementioned German Published Application (DE-C2) 35 04 491, lifting devices for raising and lowering a carrying device for a sheet pile positioned, for example, in a feeder have become known heretofore, so that a more detailed explanation thereof is believed to be unnecessary.

The carrying device 5, 5' includes transport means for driving a pile support, formed as a flat pallet 6 assigned to the machine and having the sheet pile 7 stacked thereon. In the embodiment of the invention shown in FIGS. 1a and 1b, the transport means are constructed with cylindrical rotation members 8.

It is apparent from FIG. 2 that a multiplicity of such rotation members 8, disposed in an axially parallel arrangement, form a first partial conveyor section 9, and that second partial conveyor sections 10 on both sides of the machine are assigned to the respective first partial conveyor section 9, each of the second partial conveyor sections 10 being also formed of a multiplicity of rotation members 8 in an axially parallel arrangement. Due to the fact that the construction and arrangement of the rotation members 8 in the second partial conveyor sections 10 assigned to the respective first partial conveyor section 9 is the same as that of the rotation member 8 in the first partial conveyor section 9, a flat pallet 6 can also be moved or driven horizontally by means of each of the second partial conveyor sections 10.

In an operating condition in which the carrying device 5 and 5', respectively as shown in FIGS. 1a and 1b, has been lowered down to the lower level, first transport means formed of the rotation members 8 of the carrying device 5 or 5' and second transport means arranged on both sides of the machine and assigned to the first transport means and likewise formed of rotation bodies 8, respectively constitute the first partial conveyor section 9 or 9' and the second partial conveyor sections 10 which are in alignment with one another and by means of which a flat pallet 6 can be conveyed in a transport direction T oriented transversely i.e. perpendicularly, to the travel direction D. In the embodiment of the invention shown in FIGS. 1a and 1b, the feeder 1 and the delivery 4, respectively, are provided with a conveyor section formed of the partial conveyor section 9 or 9' and 10. The respective transport direction T is indicated only by way of an example. For the sheet-fed printing machine, which is also represented by way of an example, the arrow T indicating the orientation of the transport direction is advantageous, however.

Figure 2A:
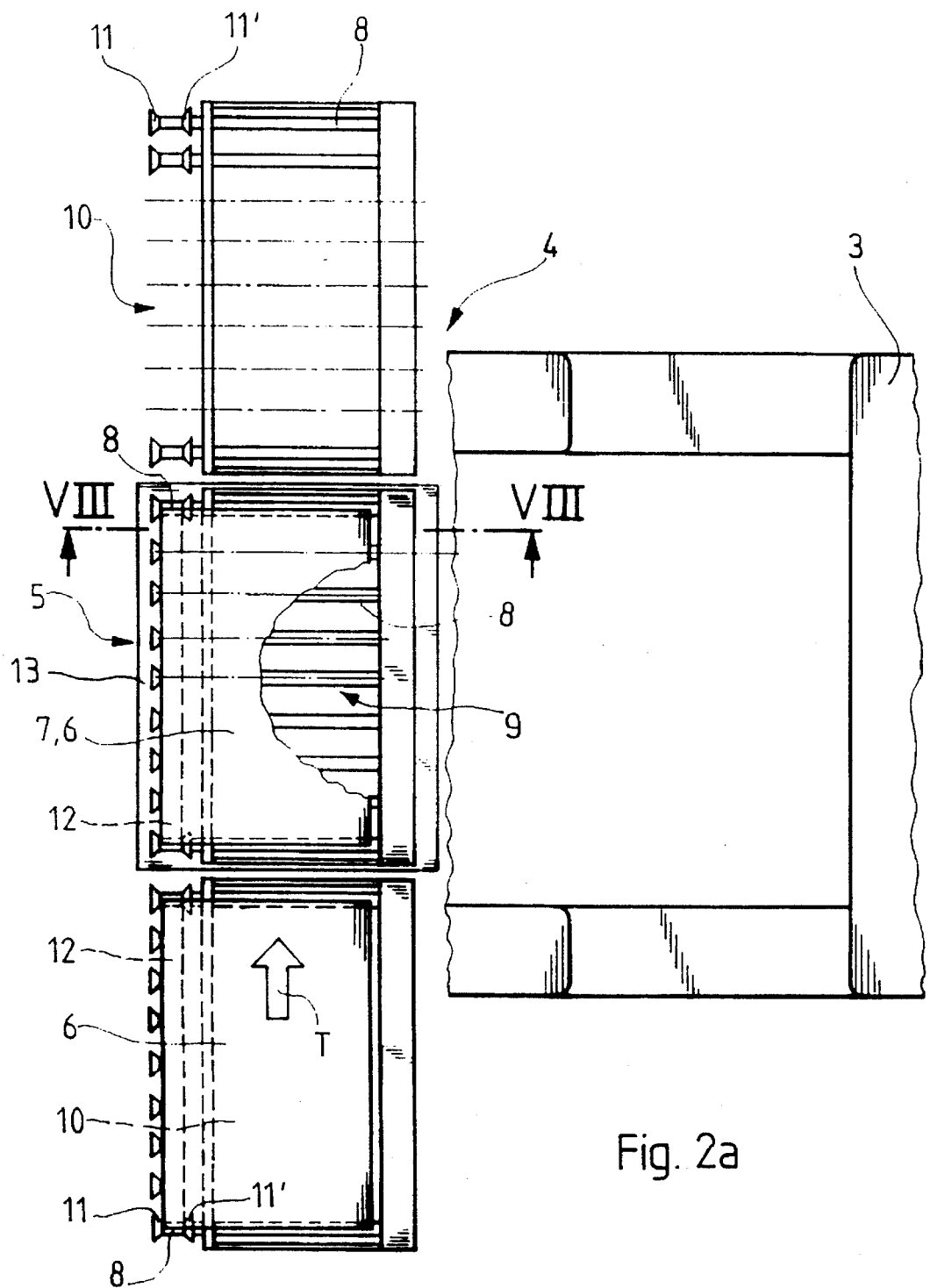
FIGS. 2a and 2b are respective left-hand and right-hand portions of a top elevational view of the sheet-processing machine according to FIG. 1 and a transportation device for a sheet pile cooperating therewith, the feeder and the delivery of the machine being partly broken away.
Figure 2B:
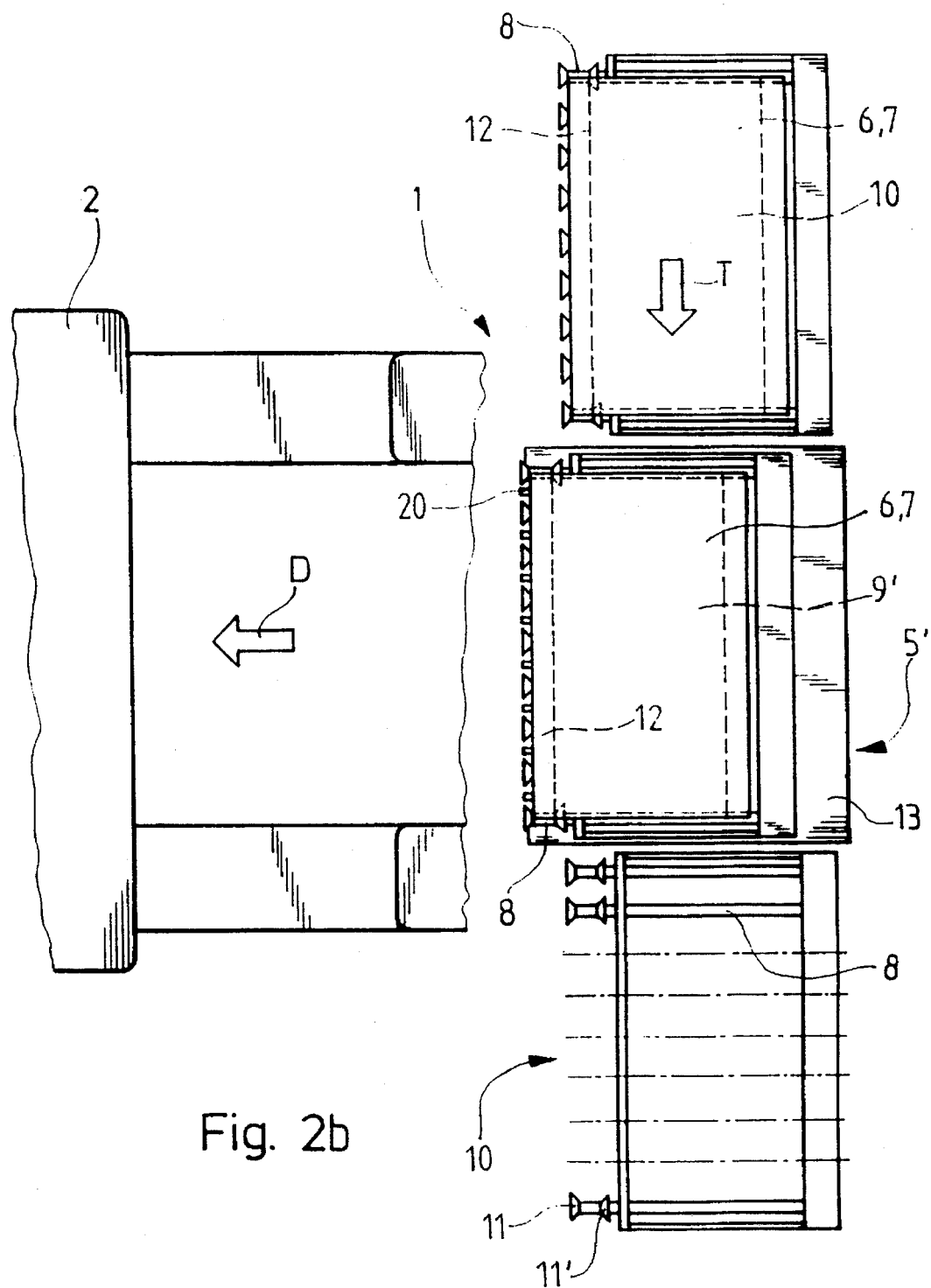

The partial conveyor section 9' is illustrated in a non-aligned position in FIG. 2b. This will be discussed in greater detail in connection with FIG. 3.

As is apparent from FIGS. 1a and 1b in combination with FIGS. 2a and 2b, a flat pallet 6 is placed on the respective rotation members 8 by which the respective transport means thereof and, finally, the respective conveyor sections assigned to the feeder 1 and the delivery 4 are formed. Each of the rotation members 8 is provided with a pair of guide flanges 11 and 11'. The respective guide flanges 11 and 11' of each pair thereof are mutually spaced apart so that they cooperate with opposite edges of the flat pallet 6 placed on the rotation member 8b; the guide flanges 11 and 11' thus forming effective guidance devices along a respective conveyor section for the flat pallet 6. The guide flanges 11 thereby constitute first guide elements of the guidance devices, while the guide flanges 11' constitute second guide elements of these devices. The bottom longitudinal edges of a longitudinal strut or span member 12 provided on the flat pallet 6 for supporting the latter on the conveyor section thereby serve as edges of the flat pallet oriented in the transport direction T and are placed on the rotation members, the guidance devices in the form of the guide flanges 11, 11' being in direct cooperation therewith.

Figure 3:
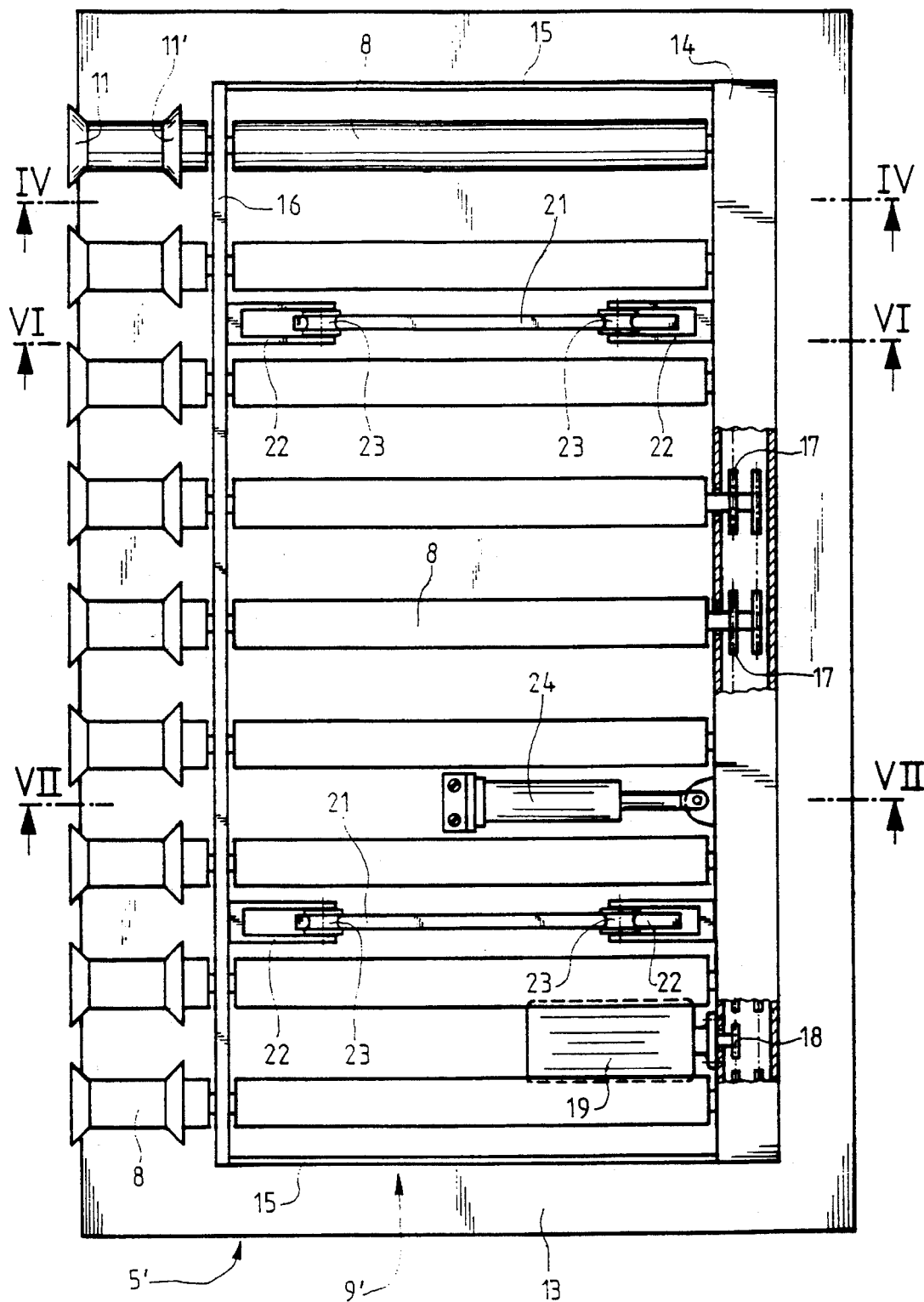
FIG. 3 is an enlarged fragmentary view of FIG. 2b showing a carrying device of the feeder without any associated lifting elements for raising and lowering the sheet pile.

A first partial conveyor section, namely the partial conveyor section 9' assigned to the feeder 1, in the embodiment of FIG. 3, is placed on a lifting plate 13. The fastening means required on the lifting plate 13 for the aforementioned lifting elements formed of cables or chains are not shown in FIG. 3 in the interest of clarity. Appropriate fastening means are usually provided in corner locations of the lifting plate 13 in correspondence with the position of the respective cables or chains for raising and lowering the lifting plate 13.

In the embodiment of the invention shown in FIG. 3, as mentioned hereinbefore, the first transport means contained in the partial conveyor section 9' are provided with cylindrical rotation members 8 having guide flanges 11 and 11'. The latter are mounted in a frame formed of a gear or transmission box 14 and frame side pieces 15 and 16 and arranged above the lifting plate 13. Due to the parallel arrangement of the rotation members 8 having respective rotational axes extending transversely to the transport direction T (note, FIGS. 2a and 2b), the gear box 14, which encloses a main drive gear 18 and secondary drive gears 17 attached to axle journals of the rotation members 8, extends in the transport direction T. A motor 19 which drives the main drive gear 18 is flanged to the gear box 14. The main drive gear 18 and the secondary drive gears 17 are interconnected, via transmission means represented by dot-dash lines, i.e., in phantom, in FIG. 3, so that the rotation members 8 are all driven, respectively, in the same rotational direction.

The partial conveyor sections 9 and 10 (note: FIGS. 2a and 2b) are advantageously of like construction. Care must be taken only that, when the partial conveyor sections 10 arranged at the sides of the machine are not disposed on a lifting plate 13, the level at which rotation members 8 are maintained is the same as that for the partial conveyor sections 9 and 9' when the latter have been lowered into a low-level operating condition.

Figure 6:
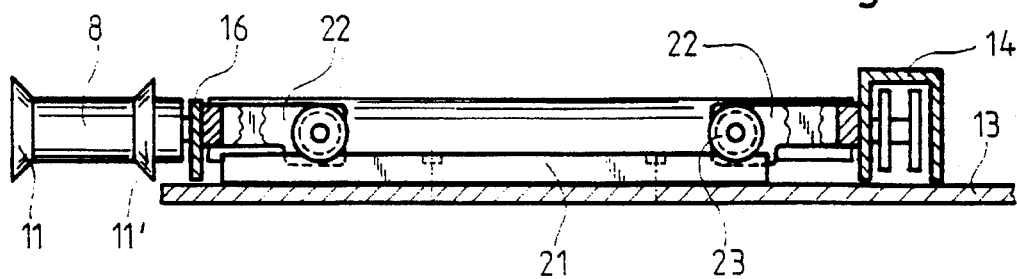
FIG. 6 is a cross-sectional view of FIG. 3 taken along the line VI—VI in the direction of the arrows.
Figure 7:
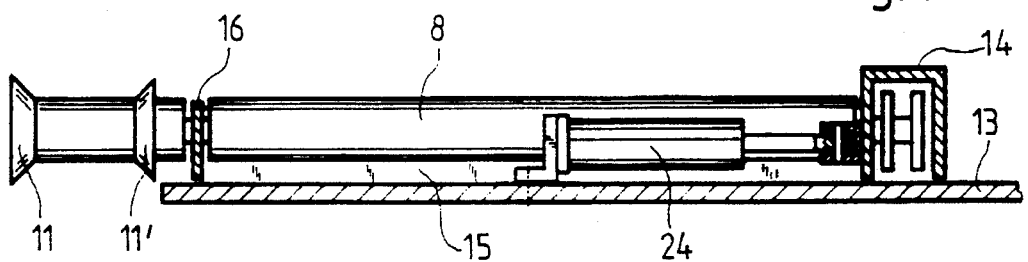
FIG. 7 is a cross-sectional view of FIG. 3 taken along the line VII—VII in the direction of the arrows.

The partial conveyor section 9' shown in a non-aligned position, in accordance with another embodiment of the invention in FIGS. 2a and 2b, is discussed hereinbelow in greater detail in connection with FIG. 3. When the partial conveyor section 9' provided in the feeder 1 of the machine is in a position of non-alignment with the partial conveyor sections 10 arranged on both sides of the machine, an operating condition results in which a flat pallet 6 received by the carrying device 5' and oriented by the guidance means in the form of the guide flanges 11 and 11' is shifted relative to the carrying device 5' in a direction transverse to the transport direction T, so that the sheet pile 7 is in contact with front stops 20 (FIG. 2b) provided in the feeder 1. The aforementioned shifting device is provided in order to achieve such an operating condition. In the embodiment shown in FIG. 3, this shifting device is formed of a pair of rails 21 (note FIG. 6) extending transversely to the transport direction T (note FIGS. 2a and 2b) and fastened to the lifting plate 13, guide rollers 23 arranged rotatably on the frame side piece 16 and on the gear box 14 by means of bearing blocks or brackets 22, so that the guide rollers 23 roll on the rails 21, and a piston-cylinder unit 24 (note also FIG. 7) which is operatively connected with the lifting plate 13, on the one hand, and with the frame, on the other hand, and has a direction of operation corresponding to the travel direction D (note FIGS. 2a and 2b).

Figure 4:
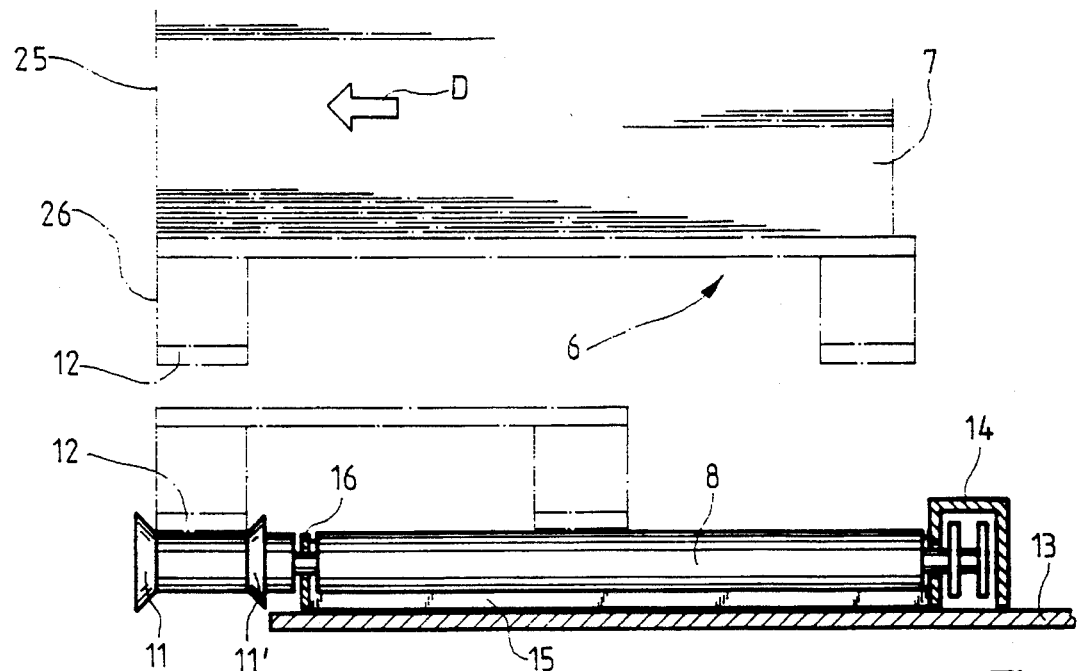
FIG. 4 is a cross-sectional view of FIG. 3 taken along the line IV—IV in the direction of the arrows.

FIG. 4 illustrates in phantom how a sheet pile 7 in delivery condition is stacked on a flat pallet 6. As mentioned hereinbefore, a lateral surface 25 of the sheet pile 7 extending transversely to the travel direction D is flush or aligned with a lateral surface 26 of the flat pallet 6, while a lateral surface located opposite this lateral surface 25 of the sheet pile 7 is, in general, offset with respect to an adjacent side of the flat pallet 6. Contrary to the representation in FIG. 4, the sheet pile 7 can also, for example, project laterally beyond the flat pallet 6.

The circumstance of the aligned lateral surfaces 25 and 26 of the sheet pile 7, on the one hand, and of the flat pallet 6, on the other hand, is then advantageously used to achieve guidance of the sheet pile 7 which is positionally correct and independent of the format of the respective sheets 39 to be processed. According to FIGS. 4 and 5, there is additionally provided, in accordance with an arrangement in which the guide flange 11, constituting a first guide element, is in contact with a longitudinal strut or span member 12 of the flat pallet 6, the longitudinal span member 12 being assigned to the lateral surface 26 of the flat pallet 6. This results in an arrangement in which a first guide element, such as the guide element in the form of a guide flange 11, referred to hereinbefore, occupies a position independent of the format of the sheets 39 forming the sheet pile 7.

A continuously correct machine-related orientation of the sheet pile 7 which is independent of the format of the sheets 39 forming the sheet pile 7 is thus achieved in an especially simple manner by an arrangement in accordance with FIG. 4 wherein one guide flange 11 or 11' is brought into contact with one longitudinal edge of the longitudinal span member or strut 12.

With respect to the spatial conditions for accommodating a partial conveyor section 9 or 9' in the delivery 4 or feeder 1 of the machine, it is especially advantageous if a section of the rotation member 8 having the guide flange 11 and supporting the longitudinal span member 12 in contact therewith is mounted in an overhung or cantilever position relative to the respective frame side piece 16.

Figure 5:
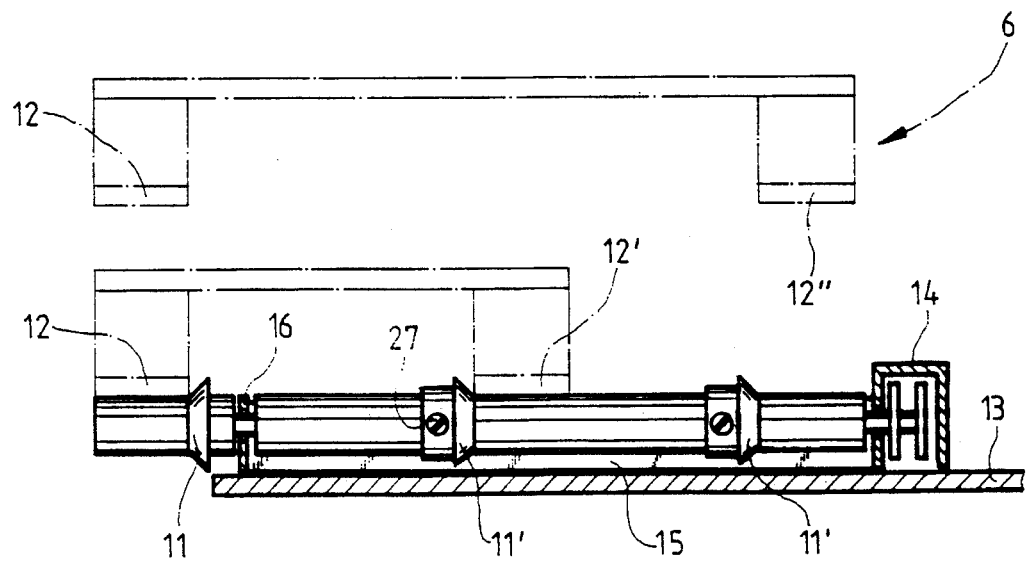
FIG. 5 is a cross-sectional view like that of FIG. 4 of an alternative arrangement of guiding means for flat pallets.

FIG. 5 illustrates an embodiment wherein two second guide elements in the form of the guide flanges 11' are provided on a rotation member 8. The spacing of the respective second guide elements formed as the guide flanges 11' from the first guide element formed as the guide flange 11 is adjusted or matched to the position of other longitudinal span members or struts 12' and 12" respectively, of flat pallets 6 having a different format, respectively.

FIG. 5 also shows, by way of examples, second guide elements in the form of guide flanges 11' which can be fixed to the rotation member 8 by means of respective adjusting screws 27, the second guide elements 11' being adjustable to the particular format of the respective flat pallets 6 and thus to the format of the particular sheets 39 to be processed. In this case, only a single guide flange 11' functioning as a second guide element is required for each rotation member 8 in addition to the first guide element in the form of the guide flange 11.

Whereas, in the case of the partial conveyor section 9' which is shiftable in a direction transverse to the transport direction T, the frame bearing the rotation members 8 and composed of the gear or transmission box 14 and the frame side pieces 15 and 16 (note FIG. 3) is shiftable with respect to the lifting plate 13, the corresponding frame, in the case of non-shiftable partial conveyor sections, is rigidly fixed to a support. In the case of the partial conveyor section 9 arranged in the delivery 4, the lifting plate 13 forms the corresponding support.

Figure 8:
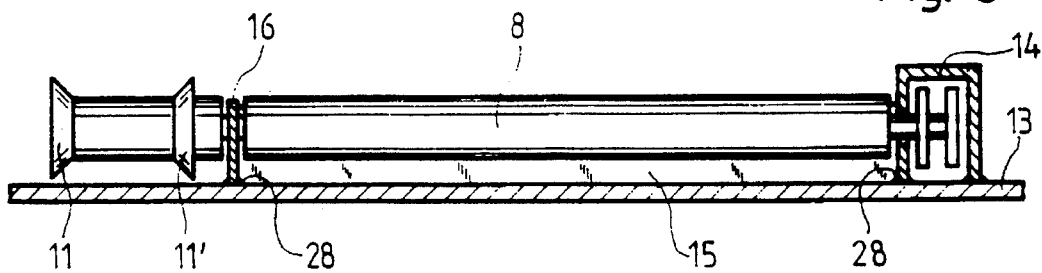
FIG. 8 is an enlarged cross-sectional view of FIG. 2a taken along the line VIII—VIII and showing a carrying device of the delivery without any associated lifting elements for raising and lowering the sheet pile.

In FIG. 8, there is shown, by way of an example, a suitable rigid connection between the frame and the lifting plate 13 which is achieved through welding seams 28.

Figure 9:
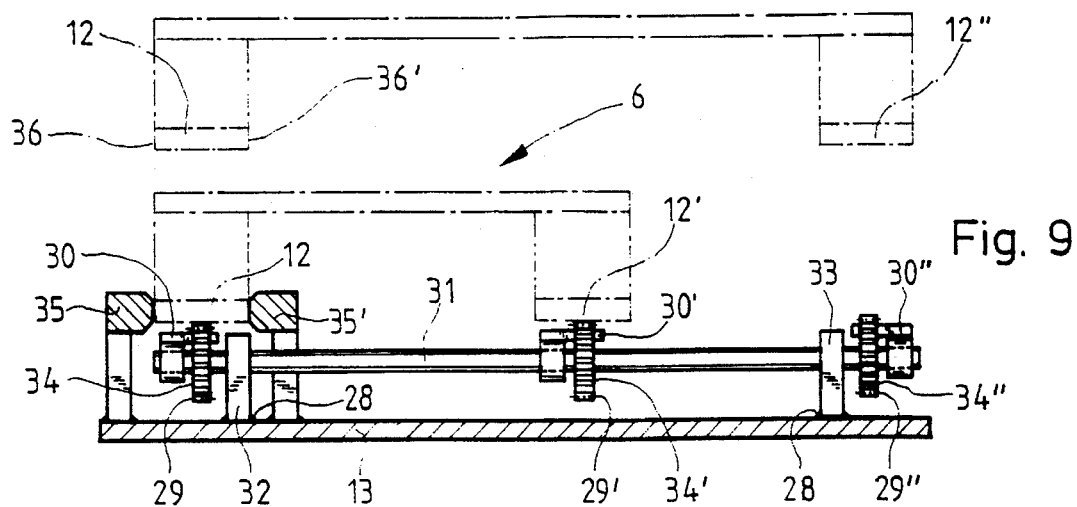
FIG. 9 is a cross-sectional view similar to that of FIG. 8 with alternatively constructed transport and guidance means.

In FIG. 9, examples of modifications of the transport and guide means are shown, having a non-shiftable partial conveyor section, i.e., the partial conveyor section 9, in the case at hand.

In the embodiment of FIG. 9, the transport means are constructed as chains 29 which are supported by means of a respective chain support rail 30. A chain or sprocket wheel shaft 31 extending transversely to the transport direction T is mounted at both the beginning and the end of the partial conveyor section 9, as viewed in the transport direction T. For the purpose of bearing the chain wheel shaft 31, a first support 32 is provided as a substitute for the frame side piece 16 in the aforedescribed embodiment according to FIG. 3, and a second support 33 is provided as a substitute for the gear or transmission box 14 also in the embodiment of FIG. 3. Instead of the overhung or cantilevered section of the rotation member 8 in the embodiments according to FIGS. 3 to 8, a chain or sprocket wheel 34, around which the chain 29 is wound, is provided on a section of the chain wheel shaft 31 which is mounted in an overhung or cantilevered position relative to the first support 32. The longitudinal strut or span member 12 of the flat pallet 6 is then placed upon the chain 29 which is supported by means of the chain support rail 30.

Figure 12:
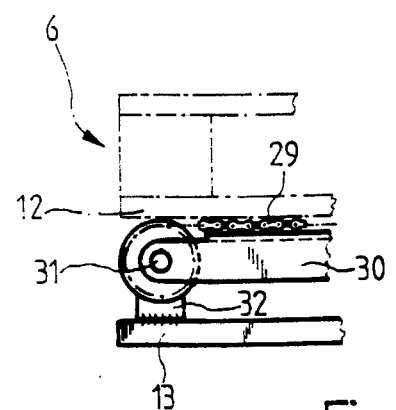
FIG. 12 is a view of FIG. 10 as seen in the direction of the arrow XII of FIG. 10.

For the purpose of accommodating a second longitudinal strut or span member 12' or 12" of a respective flat pallet 6 at the chain wheel shaft 31 and at an appropriately spaced distance from the chain wheel 34, a similar arrangement is provided which is composed of a respective chain support rail 30' or 30", a respective chain 29' or 29", and a respective chain or sprocket wheel 34' or 34" around which the chain is wound. The respective chain support rail 30, 30', 30" is supported on a chain or sprocket wheel shaft 31 at the beginning and the end of the partial conveyor section 9 (note also FIG. 12).

In the embodiment according to FIG. 9, the guidance means are provided in the form of guide rails 35 and 35' which are oriented in the transport direction T. They are shown in a cross-sectional view in FIG. 9. The guide rails 35 and 35' lie adjacent and alongside one another and are in contact with surfaces 36 and 36' of the longitudinal strut or span member 12 of the flat pallet 6 seated on the chains 29 and 29', the surfaces 36 and 36' being oriented in the transport direction T.

Figure 10:
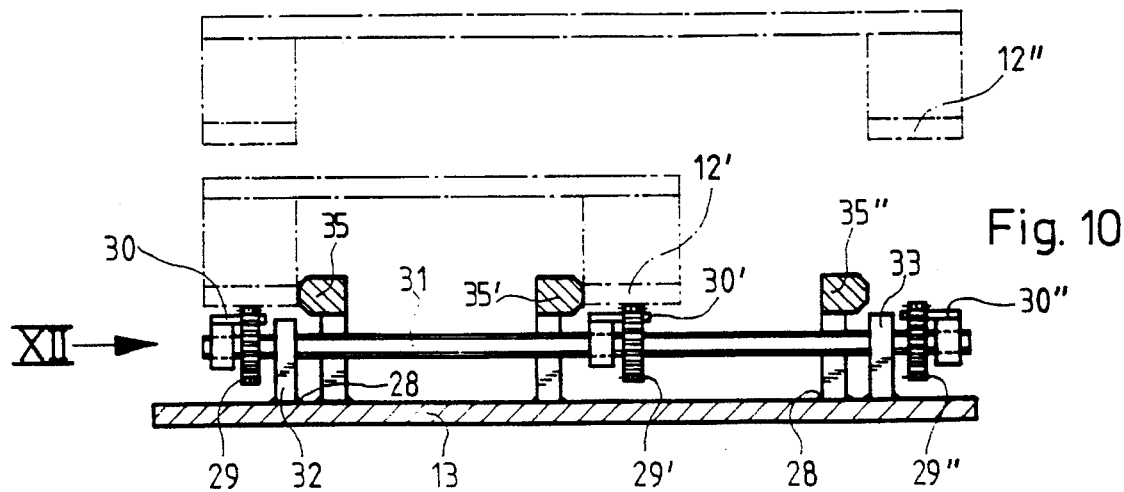
FIG. 10 is a cross-sectional view corresponding to that of FIG. 9 with an alternative arrangement of guidance means.

FIG. 10 illustrates an embodiment which varies from the embodiment according to FIG. 9 in that the guide rails 35' and 35" respectively, which function as second guide elements, are in contact with a further longitudinal strut or span member 12', 12", respectively, of the flat pallet 6.

In both of the embodiments of FIGS. 9 and 10, at least the guide rails 35 which function as first guide elements occupy a position which is independent of the format of the sheets to be processed.

Figure 11:
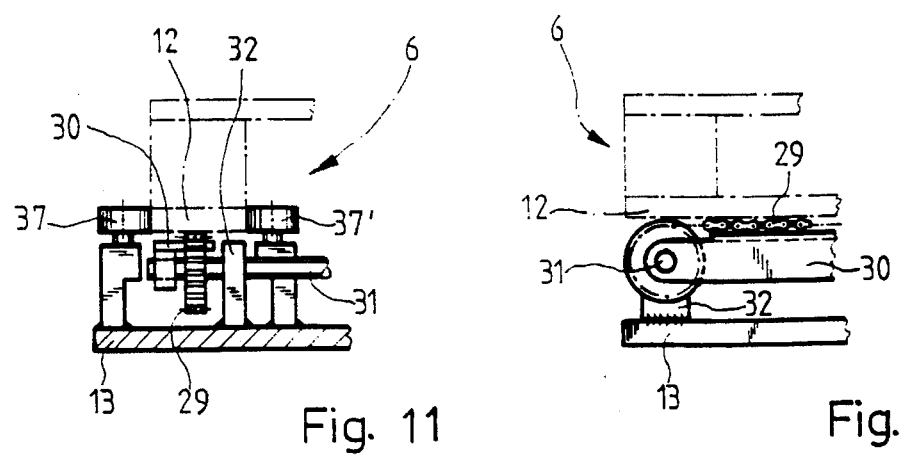
FIG. 11 is a fragmentary view corresponding to that of FIG. 9 of another embodiment of the guidance means.

FIG. 11 illustrate an embodiment which is a further possible variant with respect to the guideways oriented in the transport direction T. Instead of the guide rails 35 and 35', roller trains are provided in this embodiment, namely a roller train representing the first guide elements and formed of rollers 37, and a roller train representing the second guide elements and formed of rollers 37'. Due to the manner of representation in FIG. 11, which includes a fragmentary cross-sectional view of the carrying device, only one of the rollers 37 and one of the rollers 37' are visible.

For correct orientation of a sheet pile with respect to the machine, the driving means in the form of the secondary drive gears 17, the main drive gear 18, the motor 19, and suitable transmission means for their operative interconnection are not absolutely necessary. Conveyance or transport of the sheet pile 7 along the partial conveyor sections can also be performed manually without any need for additional devices. However, within the scope of the invention, the aforementioned drive means are used in an advantageous additional development for correctly adjusting the side register of the sheet pile 7 in the feeder 1. For this purpose, the feeder 1 contains sensors 38 which serve to locate an edge of a sheet 39 which is to be processed and which is oriented in the travel direction D. A possible principal arrangement of such sensors is shown in FIG. 1. In this case, the sensors 38 locate the lateral position of a sheet 39 after this sheet has been gripped by forwarding or pull suckers of a sheet separating device 40. More details may be obtained, for example, from the German Published Non-Prosecuted Application (DE-A1 34 33 994). Within the scope of the invention, the correct side-register adjustment of a sheet pile 7 in the feeder 1 is performed after a flat pallet 6 with a sheet pile 7 stacked upon it is moved along corresponding partial conveyor sections, namely 10 and 9' in the instant application, into a set or nominal position on the carrying device 5' by means of the aforedescribed driving means 17, 18, 19. When it is in this nominal or set position, the sheet pile 7 is initially immobilized by means of a limit switch, as described, for example, in German Patent 10 99 556, wherein the limit switch stops the motor 19. The motor 19 is then restarted by means of a sensing device formed with the sensors 38, as is explained in detail, for example, in the aforementioned German Published, Non-Prosecuted Application (DE-A1) 34 33 994.

Figure 13:
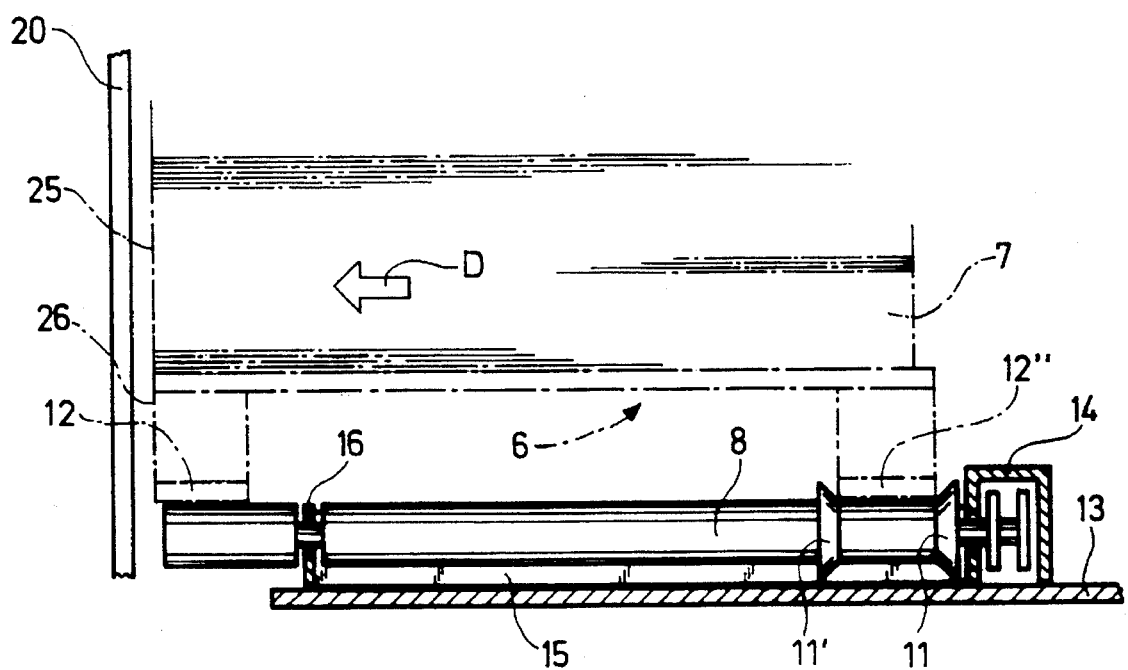
FIG. 13 is a cross-sectional view of FIG. 3 corresponding to that of FIG. 4, with yet another embodiment of the guidance means.

Whereas the guide flanges 11 project into the gaps between the aforementioned front stops 20 in the embodiment according to FIGS. 2a and 2b, these gaps are free from any components of the transport means and the guide means in the embodiment illustrated in FIG. 13. In an operating position which is adjustable by means of the piston-cylinder unit 24 (note FIGS. 3 and 7), the lateral surface 25 of the sheet pile 7, quite contrary to the presentation thereof in FIG. 13, is positioned against or in engagement with the front stops 20. The overhung or cantilevered ends of the rotation members 8 facing towards the front stops 20, are completely free from the guidance means in this embodiment. Such guidance means are thus provided in the form of a pair of guide flanges 11 and 11' at the ends of the rotation members 8 facing towards the front stops 20. The position of these guide flanges 11 and 11' and the total length of the rotation members 8 are adjusted with respect to one another in such a manner that the end of the flat pallet 6 facing in the travel direction D and disposed on the rotation members 8 and guided in a straight line by the guide flanges 11 and 11', projects in the travel direction D beyond the rotation members 8. In this aforementioned operating position, there is thus a space separating the front stops 20, on the one hand, and the overhung or cantilevered ends of the transport means formed as the rotation members 8, on the other hand.

The same effect can also be attained, for example, with the embodiment according to FIG. 5 if the overhung or cantilevered end of the rotation member 8 is shortened.

The aforementioned effect can also be attained with an embodiment according to FIG. 10, if the guide rails 35 and 35', on the one hand, and 35 and 35", on the other hand, are positioned so close to the first support 32 thereof that the flat pallet 6 projects, in the travel direction D, beyond the left-hand end of the chain wheel shaft 31 as shown in FIG. 10.

The foregoing is a description corresponding in substance to German Application P 40 23 877.6, dated Jul. 27, 1990, the International priority of which is being claimed for the instant application, and which is hereby made part of this application.

I claim:

1. In combination, a transport system for sheet piles and a sheet-processing machine including a sheet feeder, comprising:

sheet transfer means for transporting sheets in a travel direction along a sheet transport path extending from a first end to a second end of the sheet-processing machine;

flat pallets for supporting said sheet piles thereon;

a carrying device disposed in the sheet transport path on at least one of said ends of the sheet-processing machine;

lifting means connected to said carrying device for raising said carrying device to an upper level and for lowering said carrying device to a lower level;

said carrying device defining a first conveyor section with first transport means for transporting said flat pallets in a transport direction oriented transversely to the sheet transport path;

second conveyor sections dispose mutually oppositely from said first conveyor section, said second conveyor sections each having second transport means formed thereon for transporting said flat pallets in the transport direction, said first conveyor section, in a position of said carrying device at the lower level, being disposed between said second conveyor sections, being aligned therewith, and forming a conveyor path therewith for said flat pallets, said conveyor path extending transversely to the sheet transport path;

forced guide means disposed at said first conveyor section and at each of said second conveyor sections, said forced guide means directly cooperating with said flat pallets for rectilinearly guiding said flat pallets in the transport direction oriented transversely to the sheet transport path; and selectively activatable and deactivatable drive means for driving said first and second transport means, such that said first and second transport means, in an activated condition of said drive means, transport a respective flat pallet from said first conveyor section to one of said second conveyor sections and another one of said flat pallets from the other of said second conveyor sections to said first conveyor section and into alignment in said sheet transport path.

2. The combination of claim 1, including means for shifting, with respect to said carrying device, said flat pallet carried by said carrying device and oriented by said forced guide means in said transport direction transverse to said travel direction.

3. The combination of claim 1, wherein said conveyor path has parallel guideways oriented in said transport direction, and said flat pallet has opposite surfaces oriented in said transport direction for guiding said flat pallet on said guideways.

4. The combination of claim 1, wherein said first and second transport means have cylindrical rotation members with guide flanges formed thereon, and said flat pallet has opposite edges oriented in said transport direction, said opposite edges being cooperatively engageable with said guide flanges.

5. The combination of claim 1, wherein said forced guide means include first and second guide elements, a sheet pile stacked on said flat pallet has a lateral surface, and said flat pallet has a side thereof in contact with said first guide elements, and has a lateral surface at said side thereof substantially flush with said lateral surface of the sheet pile stacked on said flat pallet, said lateral surface of the sheet pile facing in said travel direction.

6. The combination of claim 5 wherein said flat pallet is formed with elongated span members for supporting said flat pallet on said first and second conveyor sections, and said first and said second guide elements are in contact with said flat pallet at a respective longitudinal side of said elongated span members.

7. The combination of claim 1, wherein said first transport means is disposed within said sheet feeder, and including sensor means for locating an edge of a sheet to be processed which is oriented in said travel direction, said flat pallet with a sheet pile stacked thereon being supported by said carrying device and being adjustable in said register by said first transport means and said sensor means.

8. The combination of claim 1, wherein said flat pallet is disposed on said first transport means and rectilinearly guided by said forced guide means, said flat pallet having one end facing in said travel direction and projecting in said travel direction beyond said forced guide means and said first transport means.

9. The combination of claim 5, wherein said flat pallets are selected from a group of flat pallets having different pallet size;

said first guide elements are arranged along a first straight line aligned with said conveyor path;

said second guide elements are arranged along at least one further straight line aligned with said conveyor path; and said at least one further straight line is spaced apart from said first straight line a distance dependent on said pallet size.

10. The combination of claim 5, wherein said flat pallets are selected from a group of flat pallets having different pallet size;

said first guide elements are arranged along a first straight line aligned with said conveyor path;

said second guide elements are arranged along one further straight line aligned with said conveyor path; and said one further straight line is spaced apart from said first straight line a distance adjustable in accordance with said pallet size.

* * * * *